United States Patent [19]

Temple

[11] Patent Number: 4,483,784

[45] Date of Patent: Nov. 20, 1984

[54] AQUEOUS PEROXIDE EMULSION FOR USE WITH GLASS FIBERS

[75] Inventor: Chester S. Temple, McKees Rocks, Pa.

[73] Assignee: PPG Industries, Inc., Pittsburgh, Pa.

[21] Appl. No.: 401,170

[22] Filed: Jul. 23, 1982

Related U.S. Application Data

[63] Continuation-in-part of Ser. No. 136,630, Apr. 2, 1980, Pat. No. 4,377,498.

[51] Int. Cl.[3] .................... C08F 4/34

[52] U.S. Cl. .................... 523/203; 526/202; 526/344; 526/348; 106/287.1; 502/158; 502/160

[58] Field of Search .................... 106/287.15; 526/202, 526/344, 348; 252/431 C, 426

[56] References Cited

U.S. PATENT DOCUMENTS

Re. 28,818 5/1976 Eymans et al. .
2,343,094 2/1944 Smith .
3,013,915 12/1961 Morgan .................... 428/251
3,061,554 10/1962 Vartanian et al. .
3,118,866 1/1964 Gregorian .
3,377,407 4/1968 Kressin et al. .
3,484,223 12/1969 Vanderbelt et al. .................... 427/387
3,485,811 12/1969 Levine et al. .
3,520,825 7/1970 Koehler et al. .
3,583,959 6/1971 Shen et al. .
3,637,633 1/1972 Dixon et al. .
3,775,341 11/1973 Barter .
3,795,630 3/1974 Jaspers et al. .
3,837,898 9/1974 McCombs et al. .
3,849,148 11/1974 Temple .................... 106/287.15
3,988,261 10/1976 Barter et al. .
4,039,475 8/1977 Oosterwijk et al. .
4,105,584 8/1978 Nörback et al. .

FOREIGN PATENT DOCUMENTS 912591 10/1972 Canada .

OTHER PUBLICATIONS

"Azo and Peroxide Free Radical Initiators—What They Are, How They Differ and How They Work", by Chester S. Sheppard and Vasanth R. Kamath, 33rd Annual Technical Conference, 1978, Reinforced Plastics/Composites Institute, The Society of Plastics Industry, Inc.

*Primary Examiner*—Jacqueline V. Howard
*Attorney, Agent, or Firm*—Kenneth J. Stachel

[57] ABSTRACT

An aqueous sizing composition has an aqueous emulsion containing an organic peroxide solid at 20° C. having improved stability and dilutability. The aqueous emulsion has the solid organic peroxide, which, for example, can be a bisperoxide or peroxy ester, solubilized in an effective amount of an organic peroxide that is a liquid at 20° C. for example, a bisperoxide or peroxyester. The emulsion has one or more cationic, anionic or nonionic lubricants in effective amounts to disperse the peroxides in water. The emulsion also has sufficient amounts of water to make an oil-in-water emulsion. In addition to the emulsion, the sizing composition has an organo silane coupling agent and lubricant and possibly a film forming polymer.

25 Claims, No Drawings

AQUEOUS PEROXIDE EMULSION FOR USE WITH GLASS FIBERS

This application is a continuation-in-part of U.S. Ser. No. 136,630, filed Apr. 2, 1980, now U.S. Pat. No. 4,377,498.

BACKGROUND OF THE INVENTION

The present invention is directed to an aqueous emulsion prepared from a solid and liquid organic peroxide, an aqueous size containing the emulsion, and sized glass fibers. More particularly, the present invention is directed to an aqueous peroxide emulsion made from a solid and liquid organic peroxide, aqueous size containing same, and sized glass fibers prepared for bonding to polymers in the reinforcement of polymeric materials.

Organic peroxides that decompose by initial cleavage of the oxygen-oxygen bond to produce free radicals act as initiators for vinyl monomers and other vinyl-containing and diene-containing materials. There are over fifty different organic peroxides classified into nine major types that are used commercially in the polymer and resin industries. The half-life ($T_{½}$) of various peroxides, which is given as a function of temperature can range from around 0.01 hours at elevated temperatures to as long as 1,000 hours at lower temperatures for the more stable peroxides. The half-life is a measure of the thermal stability of organic peroxides by measuring the time for decomposition of 50 percent of the original amount of peroxide, which is a half-life for a first-order reaction. These organic peroxides have been used in the polymerization of vinyl monomers and diene monomers and polymers to produce bulk polymers, polymer films and other polymer compositions.

Depending on the thermal stability and other physical characteristics of the particular peroxides, various organic peroxides can be used or transported in different forms when they are to act as initiators or curing agents for vinyl polymerization. Some of the organic peroxides such as the highly reactive percarbonates are so unstable that they must be shipped as a frozen solid or an undiluted liquid under refrigeration. Some less reactive organic peroxides, such as lauroyl peroxide and dibenzoyl peroxide are more stable at room temperature and can be cured with greater facility and with less stringent precautions. For example, the relatively more stable benzoyl peroxide, which is a solid at room temperature having a melting point of 106° to 107° C. can be used as granules or cystals or in a thick paste compounded with a phlegmatiser such as tricresyl phosphate. Also, benzoyl peroxide can be used in aqueous solution as is shown in U.S. Pat. No. 2,343,084 (Smith), wherein the small amount of benzoyl peroxide is dissolved in one or more polymerizable conjugated compounds and may also contain a resin in solution. This solution can be combined with a water solution of a partially saponified polyvinyl acetate. Also, it has been suggested in U.S. Pat. No. 3,795,630 (Jaspers et al) to have a chemically stable non-separating organic peroxide composition of an organic peroxide which is a solid at room temperature. The composition is obtained by mixing the solid peroxide like benzoyl peroxide with a liquid phlegmatiser like phthalate plasticizers or epoxidized soya bean oil and glycols, along with a hydrophobic alkyl group containing silica. In addition, it is shown in U.S. Pat. No. 4,039,475 (Jannes) to have a stable, pumpable aqueous suspension or organic peroxides containing one nonionic emulsifier having a maximum HLB value of 12.5 and another nonionic emulsifier having a minimum HLB of 12.5 or a second emulsifier that is anionic.

Organic peroxides such as the aryl alkyl peroxide, dicumyl peroxide; ester peroxides and aromatic and aliphatic acyl peroxides have been used in compositions for sizing fibrous materials for use in polymer applications as shown in U.S. Pat. No. 3,013,915 (Morgan). These peroxides which have low volatilities and low decomposition points usually below about 180° F. (82° C.) are deposited on the fibers from an organic solution. In the composition along with the organic peroxide there is present a suitable coupling agent.

It is also known as is shown in U.S. Pat. No. 3,837,898 (McCombs et al) to form a polybutadiene emulsion that contains heat activated curing agents to operate as a catalyst in the size coating on fibers. The curing agents are the well-known free radical catalysts such as organic peroxides, e.g., benzoyl peroxide, lauroyl peroxide, tert-butyldiethyl peracetate, diacetyl peroxide, as well as inorganic peroxides, and redox catalysts such as potassium persulfate. The polybutadiene emulsion is prepared by mixing the polybutadiene with an emulsifying agent and with benzoyl peroxide. To this mixture there is added sufficient water to form an emulsion of the liquid polymer in aqueous medium. The emulsion is then mixed with a mixture of water, glass fiber anchoring agents and a gel agent and the resulting composition is homogenized to form a sizing composition having a solids content of about 2.80 and a pH of about 10.0 to 10.5. The emulsifying agents that can be used are any conventional emulsifying agents, but preferably are the nonionic emulsifying agents such as the polyoxyethylene derivatives of fatty acid, partial esters of sorbitol anhydrides, or the polyoxyethylene derivatives of fatty alcohols, or of the alkyl substituted phenols.

It was recently suggested in U.S. Pat. No. 3,849,148 (Temple) to prepare an aqueous size for glass fibers to be used in reinforcing polyolefin materials wherein the size contained a coupling agent, a heat stable organic peroxide, a nonionic surfactant and usually a lubricant or softener, and optionally a film-former. The heat stable organic peroxide includes organic peroxides having peak decomposition temperatures above about 200° F., (93.3° C.) for example, alpha alpha' bis(t-butylperoxy)-diisopropl benzene, tris(t-butylperoxy)-diisopropyl benzene, 2,5(t-butylperoxy)hexane, and 2,5(t-butylperoxy)-hexyne. These heat stable peroxides are used in emulsions with nonionic surfactants such as polyethoxy phenols and are prepared and dispersed in water containing a coupling agent. Emulsions prepared at temperatures in the range of 120° F. (49° C.) to 210° F. (99° C.) including issoctyl phenyl polyethoxy ethanol are particularly useful. Other useful nonionic surfactants belonging to the class of polyethoxy phenols are nonyl polyethoxy ethanol and alkyl etherpolyethoxy ethanol. Other nonionic surfactants which are useful are polyalkylene glycol ethers, alkyl polyether alcohol and alkyl aryl polyether alcohol. The emulsion is prepared by thoroughly mixing the radical peroxide initiator with the nonionic surfactant maintaining the temperature of the mixture above the melting point of the free radical initiator. Suitable temperature control is possible by immersing the mixing vessel in boiling water. After thoroughly mixing the free radical peroxide initiator with nonionic surfactant, water is slowly added to the mixture at a temperature above the melting point of the free radical initiator, preferably in the range of about 140° F. (60° C.) to 150° F. (66° C.) until the emulsion inverts. The emulsion is then slowly cooled to ambient conditions by continued water addition. This emulsion is then slowly added to the aqueous mixture containing the coupling agent and the remaining water is added to the mixture to form an aqueous sizing composition for treating glass fibers.

In forming an emulsion for use in a sizing composition for glass fibers, it is necessary to obtain an emulsion that has shear stability, shelf stability and process stability and preferably that has a small particle size. It is necessary to have an emulsion rather than a suspension because of the particle size limitation. An emulsion is a two-phase system consisting of two incompletely miscible liquids, the one liquid being dispersed as fine droplets in the other liquid. A suspension is a two-phase system closely related to an emulsion, in which the dispersed phase is a solid. The stability of an emulsion depends upon such factors as particle size; difference between the density of the dispersed, discontinuous or internal phase that is the liquid broken-up into droplets and the density of the continuous or external phase which is the surrounding liquid; the viscosity of the continuous phase in the emulsion; the charges on the particles; the nature, effectiveness and amount of emulsifier used; and the conditions of storage, including the temperatures of storage, agitation and vibration and dilution or evaporation during the storage or use.

The particle size or particle size distribution of the emulsion are controlled by such factors as the quantity or the efficiency of the emulsifier, the order of mixing, and the agitation employed. The average particle size or particle size distribution of the emulsion is an important factor since large liquid particles in the emulsion or for that matter, particles of solid material as in a suspension would not provide an adequate uniform coating to the glass fibers. Solid particles would abraid the glass fibers and large liquid particles would cover the surface of the glass fiber in a spotty fashion leaving hiatuses in the coating along the fibers that as a result would not adequately contact the matrix resin to be reinforced.

The emulsion used in a sizing composition for glass fibers must be of sufficient dilution to approach a water thin liquid in order to facilitate application of the sizing composition to the glass fibers during formation of the fibers. Dilution of an emulsion, especially dilution to the extent of a water-thin-liquid can lead to an unstable emulsion. Also, the emulsion must be shear stable to withstand the mixing of the sizing composition before being applied to the glass fibers, and it must be shelf stable for periods of three days to more than a week so that the material may be stored before application to the glass fibers. Also, the emulsion must be process stable to enable the size to be applied to the fibers.

A problem that has recently surfaced with the use of some heat stable, solid organic peroxides is that, when used in an emulsion, which is formed at a temperature above the melting point of the peroxide but which is used at a temperature below the melting point of the peroxide, the emulsion tends to have particle sedimentation or creaming. An additional problem with organic peroxides that are solid at 20° C. and have a melting point and a decomposition temperature at an elevated temperature is the chance of a violent decomposition reaction during the attempt to melt the peroxide in the course of emulsification.

It is an object of the present invention to provide an emulsion of a solid, organic peroxide that has a melting point and decomposition temperature at an elevated temperature where the emulsion can be formed at a temperature below the melting point of the solid-organic peroxide and can be diluted to have a viscosity approaching the viscosity of water and that has improved shear stability, shelf stability, and process stability.

It is an additional object of the present invention to provide an emulsion of a heat-stable organic peroxide that can be used in a sizing composition for glass fibers where the emulsion is shear stable, shelf stable and process stable within the sizing composition.

It is a further additional object of the present invention to provide processes for preparing an emulsion of a heat-stable organic peroxide and a sizing composition containing same that has improved dilutability, that is shear stable, shelf stable, and process stable and that has good average particle size and particle size distribution.

It is another further object of the present invention to provide sized glass fiber strands having fibers in the strand with a coating of an aqueous sizing composition containing a coupling agent, an emulsion of heat stable organic peroxide that has improved dilutability, improved shear stability, shelf stability, and process stability, and a good particle size distribution and good average particle size and usually a lubricant or softener and optionally a film-former.

SUMMARY OF THE INVENTION

The aforementioned objects of the invention and other objects that naturally flow from the following description are accomplished by having an aqueous emulsion of a solid organic peroxide, a liquid organic peroxide, one or more emulsifiers and water. Both peroxides can have a half-life and decomposition temperature necessary for the desired use. For example, if the emulsion is used in a sizing composition for glass fibers, both peroxides should have a half-life exceeding 60 hours at 212° F. (100° C.) and 20 minutes at 300° F. (149° C.) and decomposition temperatures above 100° C.

These solid and liquid peroxides that are water insoluble or that are of limited water solubility are selected from hydroperoxides, -oxy and -peroxy hydroperoxides; dialkyl peroxides; aldehyde or ketone peroxides; diacyl peroxides, peroxyesters, peroxyacids, peroxydicarbonates, peroxymonocarbonates and perketals.

The solid and liquid peroxide should have similar solubility parameters and should be of a similar chemical type to assure solubility. Similar chemical types include similar backbone structure and similar pendant or attached groups that closely match each other in chemical characteristics such as degree of aromaticity, size and length of alkyl groups and the like. This chemical similarity assists in making the solid organic peroxide solubilizable in the liquid organic peroxide.

Varying amounts of the liquid organic peroxide may be used to solubilize the solid organic peroxide. The liquid peroxide should be used in at least an effective amount to solubilize a major amount of the solid peroxide that is to be emulsified.

The mixture of solid and liquid organic peroxide is made into an aqueous emulsion by the addition of one or more emulsifiers selected from anionic, cationic and nonionic emulsifiers. The emulsifiers are selected with a hyodrphilic-lipophilic balance (HLB) value of greater than about 8 for one emulsifier or for a blend of emulsifiers used in certain weight proportions to each other. Non-exclusive examples of chemical types of emulsifiers include: ethoxylated alcohols, ethoxylated alkyl phenols, ethoxylated fatty acids, ethoxylated fatty esters and oils, fatty esters, glycerol esters, glycol esters, monoglycerides and derviatives, sorbitan derivatives and sucrose esters and derivatives, alkylene glycol ethers, alkyl polyether alcohol, alkylaryl polyether alcohol and polyoxide alkyl condensates, when the emulsifier is a nonionic type. Nonexclusive examples for the cationic type emulsifier include quaternary ammonium compounds and derivatives, sulfonated amines and amides, fatty carbamides, alkyl imidazoline derivative and the like. Nonexclusive examples for the anionic emulsifiers include alkyl sulfonates, phosphate esters, polyamino carboxylic acids and related sequestering agents, succinates sulfo derivatives, alcohol sulfates, ethoxylated alcohol sulfates, sulfates and sulfonates of ethoxylated alkyl phenols, oils and fatty esters and the like when the emulsifiers are of the anionic type.

The temperature of formation of the aqueous emulsion is generally around ambient temperature, i.e. around 18° to 22° C. Elevated temperatures can be used to increase the solubility of the solid organic peroxide in the liquid organic peroxide. In any event, the temperature should not exceed the temperature of the melting point or the decomposition temperature of the solid organic peroxide that is used.

The amount of water added is that amount necessary to make the emulsion an oil-in-water emulsion. If the emulsion is to be shipped any considerable distance, the amount of water added is just that amount needed to invert most of the water insoluble or limited water soluble material to an oil-in-water emulsion, thereby, making the emulsion a concentrated oil-in-water emulsion. The concentrated oil-in-water emulsion can be further diluted at the location of use.

The aqueous emulsion of solid organic peroxide solubilized in a liquid organic peroxide can be prepared using any of the standard techniques and equipment know to those skilled in the art. Also, the aqueous emulsion can be used to initiate the polymerization of vinyl or diene-containing monomers and polymers. The emulsion can be combined with other additives for handling or processing purposes.

For polymerization of vinyl and/or diene groups in association with fiber reinforced polymers like homo and copolymers of polyolefins, polyamides, polyesters and the like, the emulsion can be combined with fiber treating composition ingredients such as film-formers, coupling agents, lubricants and the like. The emulsion is particularly useful in an aqueous treating composition for fibers and fillers to be use in such polymeric reinforcement. Such an aqueous treating solution is a sizing composition used to treat glass fibers during their formation. In these various compositions, the emulsion of peroxides can be used in amounts to give an amount of active peroxides for the composition in the range of greater than 0.6 to about 10 weight percent of the composition. The glass fibers treated with an aqueous sizing composition containing the organic peroxide emulsion are dried after formation to drive off some of the water of the sizing composition. The dried treated glass fibers are then ready for use as reinforcement for polymeric materials.

DETAILED DESCRIPTION OF THE INVENTION

In the preparation of the more stable, dilutable, and safe emulsion, an organic peroxide is used that is a solid at 20° C., non-exclusive examples of the solid organic peroxide with limited water solubility or water insolubility include:

2,5 dihydroperoxy; 2,5-dimethylhexane; 1,4 dihydroperoxy-1,4-dimethylbutane; 1,4 dihydroperoxy-1,4-dimethyl-2-butyne; 1,3- and 1,4-bis-(α-hydroperoxyisopropyl)-benzene; bis(1-hydrocyclohexyl)peroxide; 1-hydroperoxy-1'-hydrodicyclohexyl peroxide; 2,5-di(hydroperoxy)-2,5-dimethyl hexyne, 2,5-di(hydroperoxy)-2,5-dimethy hexane and hydroperoxides having structural formulas as follows: tert butyl—CMeEt—O—OH; HO—O—$CMe_2$—C≡C—C≡$CMe_2$—O—OH; HO—O—$CMe_2(CH_2)_4CMe_2$—OH; HO—O—C-MeEt—C≡C—C≡C≡CMeEt—O—OH; HO—O—C[$(CH_2)_5$]—C—C[$(CCH_2)_5$]—O—OH; HO—O—C[$(CH_2)_5$]—C—C—C—C—C[<$(CH_2)_5$]—O—OH dicumyl peroxide; bis-t-butyl peroxides of diisopropylbenzene (meta and para isomers and mixtures thereof); tribenzyl, tertiary butyl bis peroxide; di-tertradecone peroxide; di-hexadecaneperoxide and di-tribenzyl methyl peroxide; dilauroyl peroxide; didecanoyl peroxide; dipelargonyl peroxide; dicaprylyl peroxide, diisononanoyl peroxide; dibenzoyl peroxides and nuclear substituted derivatives thereof; 2,5-dimethyl-2,5-di(benzoylperoxy)hexane; dimyristyl peroxydicarbonates; dicetyl peroxydicarbonate; bis(4-tert butyl cyclohexyl peroyydicarbonate, and 2,2 bis 4,4 ditert butyl peroxyclohexyl propane; 1,1-ditert butylperoxy-4-tert butylcyclohexane; 2,5-bis-tertiary amylperoxy)-2,5 dimethylhexane; 1,1'ethylene bis[1-(tertiary-amyl)-peroxycyclohexane]; 2,5-bis (tertiary-butyl peroxy)-2,5-diphenylhexane; 2,6-bis(tertiarybutyl peroxy) 3,6-dimethyloctane; α, α, α', α'-tetramethyl isophthalyl di-t-butyl bis peroxide; α,α,α', α', tetramethyl isophthalyl dicumyl bis peroxide; tris-(t-butyl peroxy)diisopropyl benzene, 2,2-bis(t-butylperoxy)butane; and cyclohexanone peroxides.

The solid organic peroxide like those mentioned above are solubilized in a compatible liquid organic peroxide that has limited water solubility or is water insoluble. Non-exclusive examples of liquid organic peroxides that can be used to solubilize the solid organic peroxides of like chemical nature and/or solubility parameter are:

diperlargonyl peroxide, 2,5-di-(2-ethylhexanoylperoxy-)-2,4-dimethylhexane; t-butylperoxypivalate; t-butylperoxycrotonate; t-butylperoxy(2-ethylbutyrate di-sec-butyl peroxydicarbonate; t-butylperoxybenzoate; 2,5-di(t-butylperoxy)hexane; 2,5-di(t-butylperoxy)hexynel peroxyoctoates; t-butylperoxyacetate; t-butylperoxyisobutyrate; O-O-t-butyl-O-isopropyl monoperoxycarbonate; n-butyl-4,4-bis(t-butylperoxy)valerate; 2,5-di(t-butylperoxy)-2,5-dimethylhexane; 2,5-di(t-butylperoxy)-hexane; d-t-butylperoxide, diethylperoxide; 2,5-di(t-butylperoxy)-2,5-dimethylhexyne-3; 2,5-di(t-butylperoxy)hexyne; p-methane hydroperoxide; cumene hydroperoxide; diisopropylbenzene hydroperoxide; t-butyl hydroperoxide; methyl amyl ketone peroxide; cyclohexanone peroxide; 1,1-bis(t-butylperoxy)-3,5-trimethylcyclohexane and the like.

The amount of the compatible liquid organic peroxide used to solubilize the solid organic peroxide is at least an effective amount. The amount is the minimum amount needed to solubilize a major portion of the solid organic peroxide to be emulsified.

It has recently been suggested to use free radical initiators that are more heat-stable organic peroxides in the polymerization of vinyl and diene-containing monomers or polymers. By the use of the phrase "more heat-stable organic peroxides" it is intended to encompass those peroxides having half-lives exceeding 60 hours at 212° F. (100° C.) and 20 minutes at 300° F. (149° C.). The term "half-life" is a measure or a reactivity of the organic peroxide and is defined as the time it takes for one half of a given quantity of peroxide to decompose at a particular temperature.

Non-exclusive examples of heat stable solid organic peroxides that can be used in the aqueous emulion of the present invention are those selected from bis-peroxides like bis(tertiary-alkylperoxy)alkane, or peroxyester type organic peroxides. The bisperoxides have the general formula:

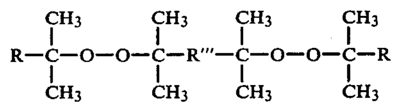

wherein R is a member of the group consisting of hydrogen, methyl and other individual hydrocarbon radicals, and phenyl. Also, the hydroperoxides having the general formula of a bis-hydroperoxide such as:

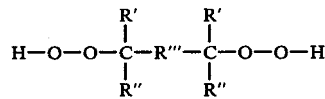

wherein R' and R'' are individual hydrocarbon radicals. For both the peroxide and hydroperoxide R''' can be a phenyl, alkyl phenyl or $(CH_2—CH_2)_n$ or (C═C) alkyl groups, where $n$ is 1, 2 or 3.

The solid peroxyester type organic peroxide has the general formula:

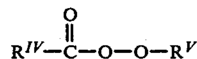

wherein $R^{IV}$ and $R^{V}$ are individual hydrocarbon radicals such as phenyl, and tert-butyl.

The organic peroxide that is a liquid at 20° C. is generally selected from bisperoxides or perester type organic peroxides. The bisperoxides are bia(tertiary-alkylperoxy)alkanes having the general formula of:

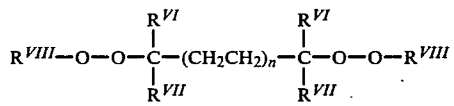

$R^{VIII}$ is a tertiary alkyl radicals, and $R^{VI}$ and $R^{VII}$ are either hydrogen, individual hydrocarbon radicals or are alkylene radicals connected to form a cycloalkylene radical and where $n$ is 1, 2 or 3. The liquid peroxyester has the general formula of:

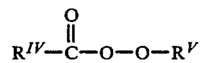

The solid and liquid organic peroxide are chosen so that their R groups closely match each other in chemical characteristics such as degree of aromaticity, size and length of alkyl groups and the like. This chemical similarity, and/or similar solubility parameters assists in making the solid organic peroxide solubilizable in the liquid organic peroxide.

Organic peroxides that are solid at 20° C. and are of the bisperoxide type having the aforementioned structural formula are made into an emulsion by solubilizing the solid organic peroxide into a liquid organic peroxide having similar parameters as mentioned above and having a similar half-life for the desired use. Non-exclusive examples of these solid organic peroxides include alpha, alpha' bis(tert-butylperoxy)diisopropyl benzene including both 1,3 and 1,4(di-tert butylperoxy)-di-isopropyl) benzenes; alpha, alpha' bis(phenyl peroxy)diisopropyl benzene; 1,1'-ethylene bis(tert amylperoxy)cyclohexane; 2,5-bis(tertiary butylperoxy)-2,5-diphenyl hexane and 8,11-bis(tertiary butyl peroxy)-8,11-dimethyl octadecane.

The bisperoxide that is a liquid at 20° C. is used in varying amounts of at least an effective amount to solubilize the solid bisperoxide since the solid bisperoxide has varying degrees of solubility in the different liquid bisperoxides. Non-exclusive examples of the liquid bisperoxides include 2,5-dimethyl-2,5-bis(t-octylperoxy)-hexane, 2,5-dimethyl-2,5-bis(t-butylperoxy)hexane, 2,5-bis(tertiary-amylperoxy)-2,5-dimethyl hexane, 1,1-ethylene bis[1-(tertiary-amylperoxy)cyclohexane], 3,6-bis(-tert-butylperoxy)-3,6-dimethyl octane; and 2,5-bis(1,5-dimethyl-2-hexylperoxy)-5,5-dimethyl hexane and the like. Non-exclusive examples of bis hydroperoxides that can be used to solubilize the soluble bishydroperoxide includes 2,5-hydroperoxy, 2,5-dimethyl hexane; 3,6-dihydro-peroxy-3,6-dimethyl octane; 1,1'-ethylene bis(-hydro-peroxy-cyclohexane) and other similar hydroperoxides.

The peroxy ester that is a solid at 20° C. is dissolved in a peroxy ester that is a liquid at 20° C. to solubilize the solid peroxy ester in order to prepare an oil-in-water emulsion. Non-exclusive examples of the solid peroxy ester include mono-tert-butyl permaleate; di-tert-butylperoxy hexahydro terephthalate; di-tert-butylperoxy adipate; di-tert-butylperoxy terephthalate; di-tert-butylperoxy phthalate; mono-tert-butylperoxyphthalate; and the like. The liquid peroxy ester peroxides that are used to solubilize the solid peroxy ester peroxide include t-butylperoxy neodecanoate, t-butylperoxy pivalate, 2,5-dimethyl-2,5-bis(2-ethyl-hexanoyl-peroxy)hexane, t-butylperoctoate, t-butylperacetate and t-butylperbenzoate and the like. The liquid peroxy ester is chosen that has a similar chemical nature and solublity parameter to the solid peroxy ester that is to be solubilized, for example, the t-butyl-perbenzoate is chosen for the solid peroxy ester di-tert-butylperoxy phthalate.

The amount of the solid organic peroxide solubilized in the liquid organic peroxide will vary according to the solubility of the organic peroxide in the liquid organic peroxide and the desired use of the organic peroxide emulsion. In addition, the amount of the liquid organic peroxide will vary according to the solubility of the solid organic peroxide. The total amount of peroxide that is the solid organic peroxide solubilized in the liquid organic peroxide in the emulsion should generally be in the range of about 1 to about 70 percent by weight of the emulsion composition of the present invention. Both the solid and the liquid organic peroxides in the emulsion alone or also in a treating solution can decompose at the desired decomposition temperatures for use in initiating free radical addition polymerization.

It is also with the scope of the present invention to use a hydrocarbon solvent for the solid and liquid organic peroxide that is water soluble or of limited water solubility. The hydrocarbon solvent is any of the low polar, strongly hydrophobic solvents including pine oils, white spirits, special boiling point spirits and aromatic solvents. The hydrocarbon solvent has a kauri-butanol number from about 50 to about 100 when the solid and liquid peroxides have substantial aromatic character or has a kauri-butanol number of around 10 to about 50 when the solid and liquid are peroxide have a substantial aliphatic character. Character in this sense means the main portion of the peroxide molecule is aromatic with aromatic or aliphatic side groups or the main portion is aliphatic with aliphatic or aromatic side groups. In addition, it is more beneficial if the hydrocarbon solvent is a fugitive solvent that can be removed from the aqueous emulsion when the emulsion is dried on a substrate. The use of the solvent can reduce the effective amount of liquid peroxide needed to solubilize the solid peroxide.

In addition to the solid organic peroxide solubilized in the liquid organic peroxide, the emulsion composition contains emulsifiers and water. The emulsifiers used can be one or more anionic, cationic or nonionic emulsifier. It is also within the scope of the present invention to use a blend of emulsifiers. Of particular usefulness in the emulsion of the present invention are the nonionic emulsifiers selected from polyethoxy phenols, poly-alkylene glycol ethers, alkyl polyether alcohol, alkylaryl polyether alcohol, ethylene oxide alkylated phenol condensation products, and condensation products of ethylene oxide and propylene glycol and mixtures thereof. These emulsifiers should generally have an HLB value of greater than 8 and preferably in the range of about 9 to about 20 and most preferably about 9 to about 15 and can be used singly or in a blend to give the desired HLB value. The HLB value as used herein refers to the hydrophilic-lipophilic balance.

An example of an emulsifier used singly in the octylphenoxy polyethoxy ethanol available from Rohm & Haas Company, under the brandname or trade designation "Triton X-100", which is nonionic and has an HLB of 13.5. The types of emulsifiers such as the "Triton X-100" can be prepared from C6–C12 alkyl substituted phenols. The number of moles of ethylene oxide per mole of hydrophobe (alkyl phenol) can vary between 1.5 and about 30. The weight percent of combined ethylene oxide is usually from 40 to 95 percent to achieve good water solubility, more typically, 60–95 percent. Another example of such an emulsifier is nonylphenoxy poly-(ethyleneoxy) ethanol.

It is not necessary that a single emulsifier be used to give the proper HLB. Any two or more surfactants having known HLBs can be combined using the proper proportions, and if the HLB is not known for a particular emulsifier it can be calculated from one or several formulas. See the article by W. C. Griggin, entitled: "Calculation of HLB Nonionic Surfactant" in the December, 1954 issue of the Journal of the Society of Cosmetic Chemistry. Typically, the emulsifier or blend of emulsifiers represents between about 0.05 and about 15 weight percent, more specifically between about 3 and about 7 weight percent, of the emulsion. The exact amount of the emulsifier required can be ascertained easily by simple trial and error technique using the aforementioned ranges as a guideline. Once a stable emulsion is obtained, use of a greater amount of emulsifiers is not necessary and it would not give any further benefits and could prove detrimental. The greater amounts of emulsifier may cause migration of any treating solution containing the emulsion from a substrate treated with the solution or composition.

It is particularly useful to use a three emulsifier blend in the emulsion of the present invention. The three emulsifiers are selected to give an overall HLB value in the range of about 9 to about 20. One emulsifier is selected that has a high HLB value in the range of about 12 to about 20. A second emulsifier has a lower HLB value in the range of about 6 to about 12 while a third emulsifier has an HLB value in a middle range of about 9 to about 15. The three emulsifiers are used in amounts that give a total HLB in the range of about 9 to about 20 and preferably about 9 to about 15. It is particularly useful to use the emulsifiers in equal proportions, although any proportion of the various emulsifiers can be used to give the desired HLB range.

In preparing the emulsion of the present invention, one or more of the desired solid peroxides is liquified in one or more liquid organic peroxides suitable for the particular solid organic peroxides involved. This mixture may be subjected to elevated temperatures to facilitate solubilization of the organic peroxide. The mixture of solid peroxide solubilized in the liquid organic peroxide has added to it the one or more emulsifiers and this mixture is agitated and emulsified according to the standard techniques, conditions and apparatus known to those skilled in the art.

When the emulsifier is the three component emulsifier blend the individual emulsifiers can be added separately to the mixture of peroxides or they can be added in a blend of all three or of any two added as a blend and then the third emulsifier added individually. After the emulsifiers are added, the resulting mixture is diluted slowly with water. The water can be at ambient temperature or at some elevated temperature. The water is added until the emulsion inverts to an oil-in-water emulsion. If the emulsion is formed at an elevated temperature, then the emulsion is slowly cooled to ambient conditions by continued water addition. The amount of water added to the emulsion is at least about 35 percent of the emulsion composition. If the emulsion is to be shipped any considerable distance, the least amount of water used is that to invert most of the water insoluble or limited water soluble materials to an oil-in-water emulsion.

This emulsion composition can be prepared into an aqueous sizing composition for treating reinforcement fibers for polymers having a coupling agent, and usually a lubricant or softener, and optionally a film-former. This preparation can involve slowly adding the emulsion to an aqueous mixture containing the coupling agent and any lubricant or softening agent and film-former and the remaining water to make the aqueous sizing mixture. Also, any lubricant or softening agent or film-former known to be used in sizing compositions for glass fibers can be added to the aqueous mixture containing the coupling agent after the emulsion is added to the aqueous mixture. The amount of the emulsion composition incorporated into the sizing composition depends on the amount of peroxide in the emulsion composition. Whatever the amount of the peroxide in the emulsion, the amount of emulsion used in the sizing composition is that amount to give an amount of active organic peroxide in the sizing composition in the range of greater than 0.6 to about 10 percent by weight of the sizing composition.

In general, once the emulsion of the present invention is prepared, the aqueous sizing composition can be made in any manner similar to that as described in U.S. Pat. No. 3,849,148 (Temple) which is hereby incorporated by reference.

The presence of the peroxide in the sizing composition is to assure the presence of active peroxide in the dried sizing residue that is on the glass fibers. The active peroxide content in the residue provides for increased bonding and/or adhesion between the glass fibers with the residue and the polymeric matrix that the glass fibers reinforce. This increased bonding is achieved by the active peroxide initiating crosslinking chemical reactions and/or polymeric chain entanglement interactions between the matrix polymer and the vinyl reactable organic moieties of the chemical compounds in the residue of the sizing composition on the glass fibers. This occurs when the matrix polymer containing as reinforcement the glass fibers with the sizing residue is heated at a temperature higher than the decomposition temperature of the peroxide. Further details of such a procedure are disclosed in U.S. Pat. No. 3,621,092 which is hereby incorporated by reference. The active peroxide content accomplishes this task because of the amount of active peroxide in the residue. Generally, the necessary amount of peroxide in the aqueous composition to yield the necessary amount of active peroxide in the residue on the fibers is in the range of greater than 0.6 to about 10 and preferably about 0.8 to about 6 weight percent of the aqueous composition. The active peroxide in the residue is usually in the range of about 0.1 to about 0.4 weight percent of the sized glass fiber strand. The amount of the peroxide emulsion in the sizing composition is any amount to effect the desired amount of active peroxide on the glass fibers.

In addition to the emulsion having the peroxide mixture, the sizing composition has an amount of organic-silane coupling agent that is usually a vinyl-containing silane in the sizing composition in the range of about 0.2 to about 10 percent by weight of the aqueous sizing composition. The amount of lubricant in the sizing composition, which is a cationic active, acid solubilizable, fatty acid amide, is generally in the range of about 0.001 to about 1 percent by weight of the aqueous sizing composition. If a film-former is used, it is usually a polyvinyl acetate polymer or copolymer in an amount in the range of about 0.5 to about 12 weight percent of the size. Another film-former that may be used is a silylated polyazamide like that available from Union Carbide Corporation under the trade designation "Y-59". Generally, the sizing composition will have a total solids content in the range of about 1 to about 30 weight percent and preferably from about 2 to about 24 weight percent.

The aqueous sizing composition is applied to individual glass fibers during their formation by any conventional method of applying sizing to glass fibers. Such methods are shown in U.S. Pat. No. 3,849,148 (Temple) which has been incorporated by reference.

The sized fibers can be used in any form such as fibers, strands, chopped strands, mats of continuous and/or chopped strand and the like for reinforcing polymers such as polyolefins, polyamides, polyesters and the like. An example of a polyolefin that is useful in polypropylene as is shown in U.S. Pat. No. 3,849,148 which shows the production of glass fiber reinforced polyolefin laminates.

PREFERRED EMBODIMENT

The emulsion of the present invention is preferably an emulsion of alpha, alpha' bis(t-butylperoxy)-diisopropyl benzene present as a mixture of para and meta isomers which is commercially available from Hercules, Inc., under the trade designation "Vul-Cup R" vulcanizing agent and polymerization catalyst.

The solid organic peroxide is solubilized in the liquid organic peroxide which is preferably 2,5-dimethyl-2,5-bi(t-butylperoxy)hexyne-3 which is commercially available from the Lucidol Division of Pennwalt Corporation, Buffalo, New York, under the brandname "Lupersol 130". In the alternative, the liquid organic peroxide can be 2,5-dimethyl-2,5-bis(t-butylperoxy)hexane, which is commercially available from Lucidol under the brandname "Lupersol 101". In order to solubilize the "Vul-Cup R" peroxide in at least the effective amount of "Lupersol" peroxide, the ratio of the solid organic peroxide to the liquid organic peroxide must be at least 1:3. The amount of the total organic peroxide including both the solid and the liquid organic peroxide to be used in the emulsion is in the range of about 1 to about 70 and more specifically about 30 to about 60 weight percent of the emulsion. If the emulsion is to be shipped by any distance by carrier it is preferred to have a greater amount of peroxide and a lesser amount of water, where the amount is as low as that amount needed to cause inversion to an oil-in-water emulsion.

It is preferred to use the three emulsifier system, in the preparation of the emulsion of the present invention. The first emulsifier is a trimethyl nonyl polyethylene glycol ether, such as, that commercially available from Union Carbide Corporation by the trade designation "Tergitol TMN-6" having an HLB of 11.7. This ether is used in an amount of about 0.1 to about 5 weight percent of the emulsion. The ether emulsifier is combined with the second emulsifier which is nonyl phenoxy polyethyleneoxy ethanol, commercially available from GAF Corporation Chemical Products, under the trade designation "Igepal CO-630" having an HLB of 13 and used in an amount of about 0.1 to about 5 weight percent of the aqueous emulsion. These two emulsifying agents are combined and stirred until clear. The third emulsifying agent is a condensate of ethylene oxide with hydrophobic bases formed by condensing propylene oxide with propylene glycol and is commercially available from BASF Wyandotte Industrial Chemical Group, under the trade designation "Pluronic-P-65" which has an HLB of 17 and is used in an amount in the range of about 0.1 to about 5 weight percent of the aqueous emulsion composition. The total amount of the three emulsifier system in the aqueous emulsion composition is in the range of about 1 to about 15 weight percent (preferably about 3 to about 12 weight percent) of the sizing composition. An amount in excess of 15 weight percent could be used but it would lead to migration from the sized glass fibers.

The glycol-oxide product emulsifier is preferably added during the formation of the emulsion by splitting the total amount to be added into two portions. The first portion, which is preferably around half the total amount, is added to the peroxide along with the mixture of the ether emulsifying agent and the ethanol emulsifying agent that is added to the solid organic peroxide solubilized in the liquid organic peroxide solution. The remaining portion of the glycol-oxide product is dissolved in warm water in about a 50:50 blend with agitation, and this blend is added to the other materials during the emulsification operation. This emulsification operation includes agitating the materials and adding an amount of warm water of about 25° to about 30° C. in the range of about 15 to 30 weight percent of the aqueous emulsion composition. An amount of cold water is added to give an amount of active peroxide in the range of about 35 to about 65 weight percent and preferably around 50 weight percent in the aqueous emulsion.

The aqueous emulsion is then preferably added to an aqueous composition containing a coupling agent, that is preferably vinyl tris(beta methoxy ethoxy) silane, present in an amount of about 0.2 to about 10 weight percent of the aqueous sizing composition. In an alternative embodiment, a lubricant such as "Emerylube", commercially available from Emery Industries, is present in the sizing composition in an amount in the range of about 0.001 to about 3 weight percent of the aqueous sizing composition. In another alternative embodiment, a polyvinyl acetate copolymer is added to the sizing composition in an amount in the range of about 0.5 to about 12 weight percent.

The aqueous sizing composition is applied to individual glass fibers during their formation according to the manner illustrated in U.S. Pat. No. 3,849,148 (Temple) hereby incorporated by reference. The aqueous emulsion of the organic peroxide can be used in any of the sizing compositions described in U.S. Pat. No. 3,849,148.

The aqueous emulsion of the present invention will be further elucidated by making reference to the following examples.

EXAMPLE I

Thirty grams of "Vul-Cup R" peroxide (para and meta isomers of $\alpha$, $\alpha'$bis(t-butylperoxy)-diisopropylbenzene were dissolved in 90 grams of "Lupersol 130" peroxide (2.5-dimethyl-2,5-bis(t-butylperoxy)hexyne-3. The mixture was clear with no particles settling out after two hours at room temperature and at cold temperatures (40° F., 3.3° C.). After 24 hours at room temperature the mixture was clear and at cold temperatures the mixture was clear with very few particles settling out. After 48 hours the stability was clear with very few particles.

EXAMPLE II

Twenty-five grams of "Vul-Cuper R" peroxide were mixed with 100 grams of "Lupersol 130" peroxide to give a ratio of 1 to 4. The two hour and 24 hour stabilities at room temperature and cold temperatures (40° F., 4.4° C.) were clear. The 48 hour stability at room temperature was clear.

EXAMPLE III

Fifty grams of "Vul-Cup R" peroxide were mixed with 50 grams of "Lupersol 130" peroxide and 100 grams of Hi-Sol 10 hydrocarbon solvent available from Ashland Chemical Company, Ohio. The Hi-Sol 10 solvent has a boiling point of 30° F. (153.3° C.) and a flash point of 15° F. (40.6° C.) and an evaporation rate of 25.0 using an ether base of 1. The twenty-four hour stability was clear and free of particles. The six hour cold temperature (40° F., 4.4° C.) stability was clear and free of particles.

Two emulsions of the solid "Vul-Cup R" peroxide solubilized in the liquid "Lupersol 130" peroxide were prepared from the formulations shown in Table I. The emulsions were made into sizing compositions in accordance with the formulations shown in Table I. The sizing compositions were used to treat glass fiber strand in the manner known to those skilled in the art to produce sized glass fiber strand for use in polymer reinforcement.

TABLE I

| Emulsion Components | Example IV gm/wt % | Example V gm/wt % |
|---|---|---|
| "Vul-Cup R" solid peroxide | 345/11.3 | 276/8.4 |
| Lupersol 130 liquid peroxide | 1035/33.9 | 1101/33.5 |
| Nonionic emulsifier blend | 103.5/3.4 | 103.5/3.1 |
| (1) Tergitol TMN-6 | 34.5/1.13 | 34.5/1.1 |
| (2) Igepal CO-630 | 34.5/1.13 | 34.5/1.1 |
| (3) Pluronic P-65 | 34.5/1.13 | 34.5/1.1 |
| Water | 300 | 300 |
| | /51.4 | /44 |
| Water | 1272 | 1507.5 |
| Stability (24 hrs.) | good | good |
| Sizing Composition Components: | | |
| Emulsion | 3056/34.8 | 3288/36.5 |
| Acetic Acid | 55/0.6 | 55/.6 |
| A-172 vinyl silane | 1197/16 | 1397/15.5 |
| Emery 6717 lubricant | 13.2/.15 | 13.2/.14 |
| Polyvinyl acetate film-former | 1050/12 | 1050/11.7 |
| Silylated polyazamide film-former | 200/2.3 | 200/2.2 |
| Water | 3000/34.2 | 3000/33.3 |
| Binder solids | 2.64 | 2.25 |
| pH | 4.5 | 4.7 |
| Fiber diameter ($\times 10^{-5}$ in) | (90-94.9) | (90-94.9) |
| LOI | 0.33% | 0.40% |

The foregoing has described an aqueous emulsion of an organic peroxide that is a solid at 20° C. solubilized in an organic peroxide that is a liquid at 20° C. The solid peroxide has a melting point and decomposition temperature at an elevated temperature and the solid and liquid peroxides have similar decomposition temperatures. The solid peroxide and liquid peroxide are matched by chemical character, e.g. a solid bisperoxide and liquid bisperoxide with similar side group moieties, and solubility parameters to effect solubilization of the solid organic peroxide in the liquid organic peroxide.

In addition to the mixture of the solid and liquid peroxides, the emulsion contains one or more emulsifying agents and water. The emulsion can be incorporated into an aqueous treating solution for fibrous materials for use in producing treated fibers for polymer reinforcement.

I claim:

1. Aqueous sizing composition for treating glass fibers wherein the sizing composition has an aqueous emulsion of an organic peroxide with improved shelf, shear and process stability, (a) an amount of the following aqueous emulsion sufficient to give the sizing composition an amount of active peroxide in the range of greater than 0.6 to 10 weight percent of the aqueous sizing composition, where the aqueous emulsion has an average particle size of around 1.5 microns or less and has:

(1) 1 to 70 weight percent of the emulsion of a mixture of an organic peroxide solid at a temperature of 20° C. and is selected from the group consisting of bisperoxides having the formula:

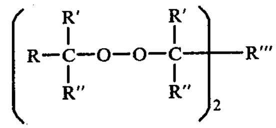

wherein R is hydrogen, alkyl hydrocarbon radical or phenyl and R' and R'' are hydrogen or alkyl hydrocarbon radicals and R''' is a phenyl, alkyl phenyl or $(CH_2—CH_2)_n$ moiety, where $n$ is 1, 2 or 3 or C≡C containing moiety and peroxyesters having the formula:

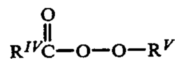

wherein $R^{IV}$ and $R^{V}$ are alkyl hydrocarbon radicals or phenyls, and (2) an organic peroxide that is a liquid at 20° C. in an amount to solubilize at least a major amount of said solid organic peroxide, where the liquid organic peroxides have a half-life exceeding 60 hours at 212° F. (100° C.) and 20 minutes at 300° F. (149° C.) and have the following bis-peroxide formula:

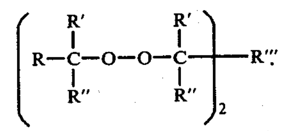

wherein R is hydrogen, alkyl hydrocarbon radical or phenyl and R' and R'' are hydrogen or alkyl hydrocarbon radicals and R''' is a phenyl, alkyl phenyl or (C≡C) or $CH_2—CH_2)_n$ moiety where $n$ is 1, 2 or 3 or the following peroxy ester formula:

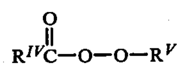

wherein $R^{IV}$ and $R^{V}$ are alkyl hydrocarbon radicals or phenyls, where the liquid bisperoxide is used with the solid bisperoxide and the liquid peroxyester is used with the solid peroxyester, (3) one or more emulsifying agents, and (4) water in an amount sufficient to make an oil-in-water emulsion (b) 0.2 to 10 weight percent of the sizing composition of a vinyl-containing silane, (c) 0.001 to 1 weight percent of the sizing composition of a lubricant, and (d) an amount of water to give a weight percent total solids for the composition in the range of about 1 to about 30.

2. Aqueous sizing composition of claim 1, wherein the liquid organic peroxide is selected from the group consisting of 2,5(t-butylperoxy) hexane or 2,5(t-butylperoxy)hexyne.

3. Aqueous sizing composition of claim 1, wherein the emulsifying agents for the emulsion are present in an amount of about 0.005 to about 15 weight percent of the emulsion and are selected from cationic, anionic and nonionic emulsifiers.

4. Aqueous sizing composition of claim 1, wherein the solid organic peroxide is selected from the group consisting of alpha, alpha' bis(t-butylperoxy)-diisopropyl benzene, tris(t-butylperoxy)-diispropyl benzene; 2,5(t-butylperoxy)hexane and 2,5(t-butylperoxy)hexyne or heat-stable peresters.

5. Aqueous sizing composition of claim 1, wherein when the solid organic peroxide is alpha, alpha' bis(t-butylperoxy)-diisopropyl benzene and the liquid organic peroxide is 2,5-(t-butylperoxy)hexyne the ratio of the solid to the liquid is at least 1 to 3.

6. Aqueous sizing composition of claim 3, wherein the nonionic emulsifiers are selected from (a) one or more polyalkylene glycol ethers, or (b) one or more alkylaryl polyether alcohols, or (c) one or more polyoxypropylene-polyoxyethylene condensates, or (d) one or more phenoxypolyethoxyethanols giving an HLB for the one or more emulsifiers in the range of about 9 to about 20.

7. Aqueous sizing composition of claim 6, wherein the nonionic emulsifiers are used in a blend of three emulsifiers wherein the ether has an HLB in the range of 6 to 12 and the polyether alcohol has an HLB in the range of about 9 to about 15 and the condensate has an HLB in the range from about 12 to about 20 each in proportions to give an overall HLB for the emulsifier group in the range of about 9 to about 20.

8. Aqueous sizing composition according to claim 7, wherein the three emulsifiers are present in equal amounts.

9. The sizing composition emulsion according to claim 7, wherein one of the three emulsifiers is trimethyl nonyl polyethylene glycol ether.

10. Aqueous sizing composition according to claim 7, wherein one of the emulsifiers is nonyl phenoxy polyethyleneoxy ethanol.

11. Aqueous sizing composition according to claim 7, wherein one of the emulsifiers is a propylene oxide-ethyleneoxide condensate.

12. Sized glass fiber strand having thereon the dried residue of a sizing composition of claim 1.

13. Aqueous sizing composition of claim 1, wherein one or more emulsifying agents have an HLB value greater than about 8.

14. Aqueous sizing composition of claim 1, wherein a hydrocarbon solvent that is water insoluble or of limited water solubility and having low polarity and being strongly hydrophobic is present to act as a solvent for the solid or liquid organic peroxide in the emulsion.

15. Aqueous sizing composition of claim 1, where a hydrocarbon solvent is present to act as a solvent for the solid or liquid peroxide and the hydrocarbon solvent has a kauri-butanol number of around 50 to 100 when the solid and liquid peroxides having substantial aromatic character or has a kauri-butanol number of around 10 to about 50 when the solid and liquid peroxides have a substantial aliphatic character.

16. Aqueous sizing composition of claim 1, where a hydrocarbon solvent is present to act as a solvent for the solid organic peroxide along with the liquid organic peroxide, and the hydrocarbon solvent has a kauri-butanol number of about 50 to about 100, when the solid and liquid organic peroxides have a substantial aromatic character or has a kauri-butanol number of around 10 to about 50, when the solid and liquid organic peroxide have a substantial aliphatic character.

17. Polyolefin reinforced with sized glass fibers having the dried residue of a sizing composition of claim 1, wherein the peroxide in the emulsion was subjected to temperatures to decompose the peroxide to free radicals to enhance the bonding of the sized glass fiber strand to the polyolefin.

18. Aqueous sizing composition of claim 1, wherein there is present a film forming polymer in an amount of about 0.5 to about 12 weight percent of the aqueous sizing composition.

19. Aqueous sizing composition of claim 18, wherein the film forming polymer is polyvinylacetate.

20. Aqueous sizing composition of claim 18, wherein the film forming polymer is silylated polyazamide.

21. Aqueous sizing composition for treating glass fibers, wherein the sizing composition has an aqueous emulsion of an organic peroxide with improved shelf, shear and process stability, comprising:

(A) an amount of the following aqueous emulsion sufficient to give the sizing composition an amount of active peroxide in the range of greater than 0.6 to 10 weight percent of the aqueous sizing composition, where the aqueous emulsion has an average particle size of around 1.5 microns or less and has:

(1) 1 to 70 weight percent of the emulsion of a mixture of an organic peroxide solid at a temperature of 20° C. and is selected from the group consisting of bisperoxides having the formula:

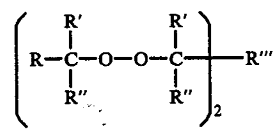

wherein R is hydrogen, alkyl hydrocarbon radical or phenyl and R' and R'' are hydrogen or alkyl hydrocarbon radicals and R''' is a phenyl, alkyl phenyl or $(CH_2—CH_2)_n$ moiety, where $n$ is 1, 2 or 3 or C≡C containing moiety and peroxyesters having the formula:

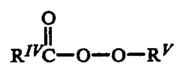

wherein $^{IV}$ and $R^V$ are alkyl hydrocarbon radicals or phenyls, and (2) organic peroxide liquid at 20° C. in an amount to solubilize at least a major amount of said solid organic peroxide, where the liquid organic peroxides have a half-life exceeding 60 hours at 212° F. (100° C.) and 20 minutes at 300° F. (149° C.) and consisting of bisperoxides having the following bis-peroxide formula:

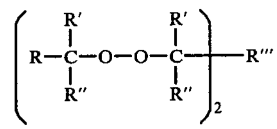

wherein R is hydrogen, alkyl hydrocarbon radical or phenyl and R' and R'' are hydrogen or alkyl hydrocarbon radicals and R''' is a phenyl, alkyl phenyl or (C≡C) or $CH_2—CH_2)_n$ moiety where $n$ is 1, 2 or 3 or peroxyesters having the following peroxyester formula:

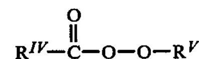

wherein $R^{IV}$ and $R^V$ are alkyl hydrocarbon radicals or phenyls, where the liquid bisperoxide is used with the solid bisperoxide and the liquid peroxyester is used with the solid peroxyester, (3) one or more emulsifying agents present in an amount of about 0.005 to about 15 weight percent of the emulsion and selected from the nonionic emulsifiers of:

(a) one or more polyalkylene glycol ethers, or (b) one or more alkylaryl polyether alcohols, or (c) one or more polyoxypropylene-polyoxyethylene condensates, or (d) one or more phenoxypolyethoxyethanols giving an HLB for the one or more emulsifiers in the range of about 9 to about 20, (4) water in an amount sufficient to make an oil-in-water emulsion (B) 0.2 to 10 weight percent of the sizing composition of a vinyl-containing silane, (C) 0.001 to 1 weight percent of the sizing composition of a lubricant, and (D) 0.5 to about 12 weight percent of the sizing composition of a polyvinylacetate film forming polymer, and (E) an amount of water to give a weight percent total solids for the composition in the range of about 1 to about 30.

22. Aqueous sizing composition of claim 21, wherein the solid organic peroxide is selected from the group consisting of: alpha, alpha' bis (t-butylperoxy)-diisopropyl benzene, tris(t-butylperoxy)-diisopropylbenzene; 2,5(t-butylperoxy)hexane and 2,5(t-butylperoxy)hexyne or heat-stable peresters.

23. Aqueous sizing composition of claim 22, wherein the liquid organic peroxide is selected from the group consisting of 2,5(t-butylperoxy) hexane or 2,5(t-butylperoxy)hexyne.

24. Aqueous sizing composition of claim 23, wherein the nonionic emulsifiers are used in a blend of three emulsifiers wherein the ether has an HLB in the range of 6 to 12 and the polyether alcohol has an HLB in the range of about 9 to about 15 and the condensate has an HLB in the range from about 12 to about 20 each in proportions to give an overall HLB for the emulsifier group in the range of about 9 to about 20.

25. Sized glass fiber strand having thereon the dried residue of a sizing composition of claim 24.

* * * * *

UNITED STATES PATENT AND TRADEMARK OFFICE

CERTIFICATE OF CORRECTION

PATENT NO. : 4,483,784

DATED : November 20, 1984

INVENTOR(S) : Chester S. Temple

It is certified that error appears in the above-identified patent and that said Letters Patent is hereby corrected as shown below:

Column 14, line 58, after "stability", insert -- comprising --.

Signed and Sealed this

*Fourth* Day of *June 1985*

[SEAL]

*Attest:*

DONALD J. QUIGG

*Attesting Officer* *Acting Commissioner of Patents and Trademarks*